April 6, 1954 P. E. MALERME 2,674,343
AIR DAMPER FOR LUBRICANT DISTRIBUTORS
Original Filed Feb. 10, 1949
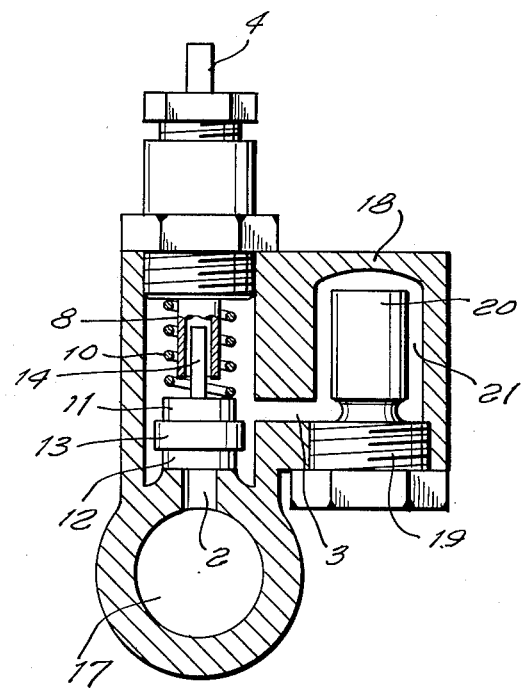
INVENTOR
PAUL EUGENE MALERME
BY Patented Apr. 6, 1954

2,674,343

UNITED STATES PATENT OFFICE 2,674,343

AIR DAMPER FOR LUBRICANT DISTRIBUTORS

Paul Eugène Malerme, Saint-Leu-la-Foret, France

Original application February 10, 1949, Serial No. 75,688. Divided and this application April 26, 1950, Serial No. 158,210

Claims priority, application France February 24, 1948

1 Claim. (Cl. 184—7)

The present application is divided out of my copending specification No. 75,688, filed on February 10, 1949, and entitled "Improvements to One Shot Lubrication Distributors With Feed Regulation by Air Chamber." It has for its object an improved air damper for lubricant distributors of the type referred to in said copending prior application, that is for distributors comprising a valve adapted to close automatically the outlet of the lubricant feeding channels as soon as the difference in pressure across it reaches a predetermined value, said valve allowing when open a lateral transfer of lubricant into an air containing damping chamber which latter empties its contents of lubricant into the lubricating channels when the pressure conditions allow the valve to return into its feed closing position.

My invention has for its object to adjust the volume of the air damper through the insertion therein of a threaded plug terminating with a part adapted to occupy a predetermined fraction of the air damper to limit the size thereof.

Preferably said plug enters the air chamber through the lower end thereof so as to prevent any leak of air between the threads on the plug and those in the opening in the air damper wall that is to receive the plug. This protection against air leaks is due to the fact that there is always a thin film of lubricant covering the lower surface of the chamber and the plug engaging same which opposes any leak of air through said threads.

I have illustrated by way of example in accompanying drawing a preferred embodiment of my invention appearing in the single figure of the accompanying drawing. In said figure: 4 designates an outlet channel for the lubricant towards the parts to be lubricated, said channel communicating with the pipe 8 fitted with some clearance round the small rod 14 rigid with the flap valve 13 carrying on either side plastic discs 11 and 12; said valve is adapted to close the oil inlet passage 2 connected with the lubricant feeding pipe 17 and a spring 10 urges the valve into the position illustrated for which it closes the lubricant inlet 2. This arrangement is by no means claimed in the present specification as it is fully disclosed and claimed in my copending specification Serial No. 75,688. It is however pointed out that the lubricant is caused to rise from 17 to 4 which allows an easy removal of the air bubbles into the passage 3 leading to the actual air damper chamber that is to receive the lubricant from the feeding pipe as soon as the valve is raised. The lubricant enters thus the passage 3 and the air chamber 18 and is delivered again out of same as soon as the valve has returned into its normal position illustrated.

Now according to my invention, the air damper 18 is provided with a removable threaded plug engaging a tapped opening extending through substantially the whole bottom wall of the chamber. Said plug 19 is provided with an extension 20 taking up a large portion of the internal capacity of the chamber. A change of plug may thus provide for a modification in the operative inner capacity 21 of the chamber and therefore in the amount of lubricant it may contain at a time. Obviously, it is possible thereby to adjust the distributor without any alteration to the actual air chamber through a mere replacement of one plug by another having an extension 20 of a different size.

What I claim is:

Lubricant distributing apparatus, comprising, in combination, a lubricant supply conduit; a first chamber communicating with said conduit for receiving lubricant therefrom; valve means mounted between said first chamber and conduit for controlling the flow of lubricant to said first chamber; a second chamber, for storing lubricant, having a closed top end and an open, threaded bottom end, said second chamber having an elongated substantially cylindrical inner side wall and communicating adjacent said bottom end thereof with said first chamber; and an elongated substantially cylindrical plug of a diameter smaller than the diameter of said inner side wall of said second chamber extending into the latter almost up to said top end thereof and forming an annular, cylindrical space with said inner side wall of said second chamber, said plug having a bottom threaded end threadedly engaging and filling said bottom open end of said second chamber.

References Cited in the file of this patent

UNITED STATES PATENTS

| Number | Name | Date |
|---|---|---|
| 2,003,281 | Bijur | June 4, 1935 |
| 2,005,166 | Roberts | June 18, 1935 |
| 2,034,296 | Hewitt | Mar. 17, 1936 |
| 2,100,404 | Mason | Nov. 30, 1937 |

FOREIGN PATENTS

| Number | Country | Date |
|---|---|---|
| 248,672 | Great Britain | Mar. 11, 1926 |
| 838,940 | France | Dec. 16, 1938 |